US006632859B1

(12) United States Patent
Jones et al.

(10) Patent No.: US 6,632,859 B1
(45) Date of Patent: Oct. 14, 2003

(54) ALKYD-BASED INK VEHICLES AND INK COMPOSITIONS

(76) Inventors: Raymond H. Jones, 2623 Ferol La., Lynn Haven, FL (US) 32444; Thomas C. Jordan, P.O. Box 123, Century, FL (US) 32535

( * ) Notice: Subject to any disclaimer, the term of this patent is extended or adjusted under 35 U.S.C. 154(b) by 0 days.

(21) Appl. No.: 09/971,240

(22) Filed: Oct. 4, 2001

Related U.S. Application Data

(63) Continuation of application No. 09/271,194, filed on Mar. 17, 1999, now abandoned.

(51) Int. Cl.[7] .................... C09D 11/10; C08L 67/08; C08L 93/04; C08G 63/49
(52) U.S. Cl. .................... 523/160; 524/272; 525/48; 525/517.5
(58) Field of Search .................... 523/160, 161; 524/270, 271, 272; 525/517.5, 389, 390, 39, 48; 106/31.6, 220, 226, 227, 228, 244, 266, 267

(56) References Cited

U.S. PATENT DOCUMENTS

| | | | |
|---|---|---|---|
| 3,714,090 A | | 1/1973 | Lasher |
| 3,772,171 A | | 11/1973 | Savageau et al. |
| 3,847,850 A | | 11/1974 | Rudolphy |
| 3,883,454 A | | 5/1975 | Dhein et al. |
| 4,056,495 A | * | 11/1977 | Kawamura et al. ......... 106/252 |
| 4,079,026 A | | 3/1978 | Mone |
| 4,133,786 A | | 1/1979 | Harris et al. |
| 4,140,663 A | | 2/1979 | Enomoto et al. |
| 4,147,675 A | | 4/1979 | Aritomi |
| 4,181,638 A | | 1/1980 | Lasher |
| RE30,660 E | | 6/1981 | Laganis |
| 4,335,027 A | | 6/1982 | Cremeans et al. |
| 4,368,316 A | | 1/1983 | Laddha et al. |
| 4,773,937 A | | 9/1988 | Schneider et al. |
| H643 H | | 6/1989 | Drury, Jr. |
| 4,997,480 A | | 3/1991 | Rao |
| 5,308,390 A | | 5/1994 | Pennaz |
| 5,324,350 A | | 6/1994 | Bender et al. |
| 5,403,391 A | | 4/1995 | Womack |
| 5,427,615 A | | 6/1995 | Jordan |
| 5,612,445 A | | 3/1997 | Jones |
| 5,645,636 A | | 7/1997 | Schneider et al. |
| 5,902,389 A | | 5/1999 | Jordan |
| 5,965,633 A | | 10/1999 | Revol |

FOREIGN PATENT DOCUMENTS

JP     401108280     4/1989

OTHER PUBLICATIONS

Alger, Mark; Polymer Science Dictionary 2nd Ed., Chapman & Hall, London, 1989 (p. 553).

* cited by examiner

*Primary Examiner*—Callie Shosho

(57) ABSTRACT

The specification discloses improved alkyd-based ink vehicles for lithographic inks. An ink vehicle according to the invention may contain a rosin ester resin, an ink solvent and from about 1 to about 30% by weight alkyd resin comprising the reaction product of a monounsaturated cyclic diacid anhydride, a polyol and a tall oil fatty acid. The ink vehicle enables faster ink drying and improved pigment wetting without significant adverse affects on other properties of ink formulations such as misting and volatility.

24 Claims, No Drawings

ALKYD-BASED INK VEHICLES AND INK COMPOSITIONS

This application is a continuation of application Ser. No. 09/271,194, filed Mar. 17, 1999 now abandoned.

FIELD OF THE INVENTION

This invention relates to alkyd-based resins for improving the wetting and drying properties of ink vehicles and ink compositions containing such vehicles, and to ink vehicles and ink compositions containing the resins.

BACKGROUND

In conventional lithographic printing processes, image and non-image areas are created on printing plates by a combination of photo-mechanical and photo-chemical processes which make the image area ink receptive and the non-image area water receptive. The image areas are oleophilic and hydrophobic whereas the non-image areas are hydrophilic and oleophobic.

Accordingly, in principle the image areas accept only ink while the non-image areas accept only water so that the ink is limited to the image areas of the plate. The ink composition is applied to the plate by first wetting the plate with water to cause the non-image areas to become saturated, and the ink is then applied over the plate surface adhering only to the image areas.

After coating the image areas of the plate with ink, the plate then transfers ink from the image areas to a blanket or intermediate roller which, in turn, transfers the ink to a substrate or media to be printed in the desired pattern. This method of printing is used in most commercial lithographic printing processes and is typically referred to as "offset" printing.

In order to promote drying, ink film toughness and lower volatiles once an image is printed, lithographic inks generally contain from about 1 to about 30 wt. % alkyd resin, a modified vegetable oil component or a combination of the two. Conventional alkyd components used to promote drying are made from vegetable oils such as soy and linseed oils which possess a relatively high amount of nonconjugated unsaturated compounds. These components dry or become solid by an oxidation process which is relatively slow, thereby limiting the speed of the printing and finishing process.

Another problem with conventional lithographic ink formulations stems from their tendency to have a "bronze" appearance on the surface of the printed ink film. This phenomena varies with different pigments and is related to how well the pigment particles are wet by the other components of the vehicle.

In addition to vegetable oil-derived alkyd resins which promote drying, ink film toughness, lower volatiles, and pigment wetting, lithograph ink formulations typically contain primary resins such as phenolic or maleic modified rosin esters for improving the gel structure of the ink in order to improve the print quality and reduce misting of the finished ink during printing. In some cases, hydrocarbon-based resins of varying compositions may be used as the primary resin component. It is also common to include with the primary resin a secondary or co-resin to further modify the ink properties such as the ink transfer and ink oil solubility of the primary resin component. Typical co-resins include hydrocarbon-based resins and rosin ester resins.

Accordingly, it is an object of the invention to provide an improved vehicle for ink formulations.

Another object of the invention is to provide a method for making ink vehicles for lithographic ink formulations which exhibit improved drying properties, especially increased drying rates.

Yet another object of the invention is to provide environmentally friendly ink vehicles for lithographic ink formulations.

Still another object of the invention is to provide an ink vehicle and an ink formulation containing the vehicle which exhibits improved pigment wetting properties thereby reducing the bronze appearance on the printed ink surface.

A further object of the invention is to provide an ink vehicle and an ink formulation containing the vehicle which exhibits an improved gel structure for improved performance on modem, high-speed printing machines.

SUMMARY OF THE INVENTION

With regard to the above and other objects, the invention provides an improved lithographic ink vehicle which comprises a primary resin which is preferably a phenolic or maleic modified rosin ester, an ink solvent and from about 1 to about 30% by weight of an alkyd resin comprising the reaction product of a mono-unsaturated cyclic diacid anhydride, a polyol and a fatty acid. The vehicle may also contain a metallic cross-linking agent and a secondary or co-resin, such as a base- or acid-catalyzed rosin ester as described in commonly assigned application Ser. No. 08/975,585, filed Nov. 21, 1997, the disclosure of which is incorporated herein by reference.

Another aspect of the invention involves providing an improved lithographic ink formulation containing a flushed pigment and from about 45 to about 65% by weight of an ink vehicle which includes a primary resin, ink solvents and from about 1 to about 30% by weight of an alkyd resin comprising the reaction product of a mono-unsaturated cyclic diacid anhydride, a polyol and a tall oil fatty acid. The formulation may also contain a metallic drying agent and a wax or wax compound and a secondary or co-resin along with a metallic cross-linking agent to assist in gellation of the formulation.

According to another aspect of the invention, an improved method is provided for making an ink vehicle especially well suited for use in lithographic inks which comprises reacting a mono-unsaturated cyclic diacid anhydride, a polyol and a tall oil fatty acid under conditions sufficient to produce an alkyd resin and mixing from about 1 to about 30 wt. % of the alkyd resin with a primary resin, an ink solvent and, optionally, a secondary or co-resin and a metallic cross-linking agent for gellation.

Ink vehicles incorporating alkyd resins according to the invention enable the production of lithographic inks which exhibit significantly improved drying rates and pigment wetting properties as compared to known ink vehicles and inks containing conventional vegetable oil-derived alkyd components. The improvement is especially evident with rubine red inks. When included with ink vehicles in ink compositions, alkyd resins according to the invention also have been found to confer improved gel structures, thereby limiting the need for costly metallic gellants.

Ink vehicles according to the invention are also environmentally friendly in that they may be formulated with naturally-derived materials such as rosin esters and with alkyds derived from tall oil fatty acids (TOFA), both of which are by-products of wood, a renewable resource, and these materials also generate considerably decreased volatiles considered harmful to the environment.

DETAILED DESCRIPTION OF PREFERRED EMBODIMENTS

The invention provides improved ink vehicles for lithographic printing ink compositions. A key feature of the invention lies in the use in ink vehicles containing an alkyd resin derived from a reaction mixture containing a diacid anhydride with cyclic monounsaturation. The preferred anhydride is 1,2,3,6-tetrahydrophthalic anhydride (THPA). However, $C_1$–$C_6$ alkyl or alkenyl ring substituted diacid anhydrides with cyclic monounsaturation may also be used.

Another key component in the reaction mixture is a tall oil fatty acid (TOFA) derived from the fractionation of crude tall oil (CTO), a by-product of the wood pulping process. Of significance to this invention, TOFA characteristically contains significantly less nonconjugated polyunsaturation than soy and linseed oils. These oils are commonly used to produce alkyd resins due to the faster dry times which result from the oxidative crosslinking of their higher linoleic and linolenic acid contents as compared to the content of linoleic and linolenic acid in TOFA. A suitable TOFA may be selected from tall oil fatty acids available from Arizona Chemical Company of Panama City, Florida under the tradenames SYLFAT FA-2, SYLFAT FA-1 Special and SYLFAT FA-1. It has been discovered, quite surprisingly, that the use of THPA in combination with TOFA in an alkyd formulation results in faster dry times than those for soy- or linseed-based alkyds. Without being bound by theoretical considerations, it is believed that the faster dry times are due to additional oxidative crosslinking obtained from the THPA moiety.

The reaction mixture for producing the alkyd also contains a polyol which may be selected from polyhydric polyols, preferably from the group consisting of glycerol, trimethylolethane, trimethylolpropane, dimethylolpropane, pentaerythritol, dipentaerythritol and sorbitol. The polyhydric polyols may also be used in combination with diols such as ethylene glycol, propylene glycol, butylene 1,3-glycol, diethylene glycol and neopentyl glycol.

The reaction mixture also preferably contains an acid catalyst, preferably a Bronsted acid, which may be selected from mineral acids and organic acids such as phosphoric acid, hypophosphorous acid, phosphorous acid, sulfuric acid, trisnonylphenylphosphite, toluene sulfonic acid, and the like. Of the foregoing, phosphoric acid is the most preferred acid catalyst for use in the invention.

In order to produce alkyd resins according to the invention, from about 50 to about 60 wt. % TOFA is mixed with from about 25 to about 30 wt. % monounsaturated cyclic diacid anhydride and from about 15 to about 20 wt. % polyol. Preferably, the TOFA comprises from about 55 to about 57 wt. % of the mixture, most preferably about 56 wt. %, the anhydride comprises from about 26 to about 28 wt. % of the mixture, most preferably about 27 wt. %, and the polyol comprises from about 17 to about 19 wt. %, most preferably about 18 wt. % of the mixture. The amount of catalyst used to promote the reaction is based on the total weight of the mixture and may range from about 0.01% to about 0.1% by weight of the mixture, preferably from about 0.02% to about 0.08% by weight, and most preferably about 0.05 wt. % of the mixture.

While the order of addition of the reactants to the reaction vessel is not critical to the invention, it is preferred to add the lower viscosity components to the reaction vessel before adding higher viscosity components in order to facilitate providing a substantially homogeneous reaction mixture. Accordingly, TOFA is preferably charged to the reaction vessel before charging the THPA to the reaction vessel. In order to reduce discoloration of the alkyd resin, the reaction vessel is preferably maintained under a nitrogen atmosphere during the charging and reaction steps. Once the TOFA has been charged to the reaction vessel, the TOFA is stirred and THPA in solid form is admixed with the TOFA. Glycerine is preferably then admixed with the components followed by phosphoric acid. It is preferred to add the phosphoric acid, which is a viscous liquid, from a nitrogen pressurized charge vessel.

A suitable vessel for the reaction will typically contain a condenser for condensation and removal of water and any other volatiles formed during the reaction and suitable means for mixing or stirring the reactants to assure good and continuous contact, uniform heating and complete reaction.

The reaction is typically conducted at a temperature ranging from about 190° to about 250° C., preferably at from about 210° to about 230° C. Total reaction time may range anywhere from about 10 to about 35 hours depending on the scale of reaction and the conditions employed. Accordingly, means are required for sustained or continuous heating of the reactants in the vessel. Suitable heating means include internal and external heaters as well as heated external circulation loops. However, the particular apparatus used for heating the reactants is not believed to be critical to the invention so long as the heating in combination with the stirring maintains a substantially uniform temperature throughout the reaction mass during the reaction.

The reaction is conducted at atmospheric pressure and/or subatmospheric pressures, however, superatmospheric pressures may also be used. In order to reduce undesirable side reaction or oxidations, it is preferred to conduct the reaction under an inert gas blanket or purge employing, for example, nitrogen gas.

As the reaction nears completion, the amount of water of esterification being formed is substantially reduced. At this point in the reaction it is advantageous to use a nitrogen sparge to facilitate water removal, which will drive the reaction to completion. Alternatively, a subatmospheric pressure may be used to remove water or low molecular weight components from the reaction mixture.

The acid number of the reaction mass is an additional means for determining when the reaction is substantially complete. A final acid number of less than 5 is desirable. The acid number of the reaction product is preferably determined according to the method set forth in ASTM D-803-93.

The viscosity of the product is also preferably measured in order to determine if the desired endpoint has been reached. The viscosity of alkyd resins according to the invention is preferably in the range of from about Z6.0 to about Z7.5 at 25° C. by the Gardner-Holdt method, and most preferably from about Z6.5 to about Z7.0 at 25° C. (about 340 bubble seconds by ASTM D-1545-89).

The product of the reaction is a highly viscous, yellow to amber, relatively clear liquid. The Gardner Delta color of the alkyds made according to the invention typically ranges from about 5 to about 6 which is a relatively light color for TOFA alkyds.

The iodine number of a product is a measure of its unsaturation. It is defined as the number of grams of iodine absorbed by 100 grams of the material. The iodine value of alkyds made according to the invention preferably ranges from about 110 to about 125 as determined by ASTM D-1959-85. The relatively high iodine value is believed to be due to the additional unsaturation in the THPA moiety, which, as described above, is believed to contribute to the faster cure times of such products.

The hydroxyl value of a product is a measure of its free hydroxyl groups which help to determine the product's polarity or solubility in a particular application. The hydroxy value is defined in terms of the reactivity equivalent to a predetermined number of milligrams of KOH per gram of sample. Alkyds made according to the invention typically exhibit relatively low hydroxyl values which range from about 16 to 20 about 21.

The reaction product of TOFA, a monounsaturated cyclic diacid anhydride such as 1,2,3,6-tetrahydrophthalic anhydride (THPA) and a polyol has been found to provide alkyd resins which, when incorporated into ink compositions, exhibit faster cure or drying rates than alkyd resins derived from the reaction of vegetable oils with phthalic anhydride.

When incorporated into an ink vehicle for use in lithographic ink formulations, alkyd resins made according to the invention also promote improved pigment wetting. The pigment wettability characteristics of the alkyd resins may be determined by visual comparisons of 0.4 mil films of the inks printed side by side over coated book stock with black bar, form 3NT-3 which is available from the Leneta Company of Mahwah, N.J., using a LITTLE JOE laboratory color proofer model S-80 which is available from Little Joe Industries, of Belle Mead, N.J.

As mentioned above, ink vehicles incorporating alkyd resins according to the invention will typically contain in addition to the alkyd a primary resin, a secondary or co-resin, an ink oil and a gelling agent.

The primary resin component of the lithographic ink vehicle is preferably a modified rosin ester such as phenolic or maleic modified rosin esters, however, hydrocarbon resins or modified hydrocarbon resins which have relatively high viscosities and possess relatively limited solubility in ink oils at room temperature may also be used. As used herein, the term "rosin ester" will be understood to include esterified gum rosin, wood rosin, tall oil rosin and modified forms thereof, i.e. dimerized, maleated and/or polymerized versions of any of these rosins. Rosin is derived from pine trees (chiefly pinus palustris and pinus elliottii). Gum rosin is the residue obtained after the distillation of turpentine from the oleoresin tapped from living pine trees. Wood rosin is obtained by extracting pine stumps with naphtha or other suitable solvents and distilling off the volatile fraction. Preferred rosin esters for use in the present invention are esters of tall oil rosin and gum rosin. Such phenolic or maleic modified rosin esters are well known in the ink and vehicle industry. Examples of phenolic modified rosin esters used as primary resins for ink vehicles include, but are not limited to, SYLVAPRFNT 6024, 6201HV, 6200HV and RL64. Examples of maleic modified rosin esters used as primary resins for ink vehicles include, but are not limited to, SYLVAPRINT 4528 AND 423, all of which are available from Arizona Chemical Company of Panama City, Fla.

Conventional hydrocarbon resins useful in the ink vehicle are derived from monomers containing from about 5 to about 15 carbon atoms such as 1,3-cyclopentadiene. Cyclopentadiene is formed along with other hydrocarbon compounds during the cracking of petroleum and is separated from the $C_4/C_5$ fractions by thermal dimerization followed by distillation to produce a residual dicyclopentadiene (DCPD) concentrate. The DCPD concentrates may vary in purity and may contain co-dimers of DCPD and other dienes. Often DCPD is copolymerized with modifiers such as rosin or distilled tall oil to provide resins with improved properties for printing ink applications. Maleic anhydride in conjunction with polyol may be used to modify such DCPD resins. Combinations of modified rosin esters and hydrocarbon resins may also be used as the primary resin component of the ink vehicle.

Specific examples of modified hydrocarbon resins which can be used as primary ink vehicle resins include, but are not limited to ALPHA-REZ 94, ALPHA-REZ 4150 and ALPHA-REZ 4148 available from Lawter International, Inc. of Northbrook, Ill., and the modified hydrocarbon resins described in U.S. Pat. No. 5,587,007 to Curvin, which is incorporated herein by reference as if fully set forth.

The primary resin preferably has a solution viscosity in the range of from about Z2.0 to about Z10 at 25° C. measured by dissolving ten grams of resin in twenty grams of alkali refined linseed oil (1:2 ARLO) according to the Gardner Holdt bubble tube test method. The MAGIESOL 47 (M-47) tolerance of the primary resin component is determined by titrating 10 grams of the 1:2 ARLO cut with MAGIESOL 47 to a cloud point. MAGIESOL 47 tolerance for primary resin components range from about 0 to greater than about 200 milliliters at 25° C. MAGIESOL 47 is an ink oil available from Magie Brothers Oil Company, a Division of Pennzoil Corp.

The ring and ball softening point of the primary resin component, as determined by ASTM E28-67, is preferably from about 140° to about 180° C. The lithographic ink vehicle will typically contain from about 20 to about 65 wt. % of the primary resin component, preferably from about 20 to about 30 wt. %.

The primary resin component of the ink vehicle may be selected from mid to high viscosity resins, most of which have low ink oil solubility and relatively poor ink transfer and gloss properties.

A secondary or co-resin component is included, if necessary, in the vehicle formulation to balance solubility and to improve ink gloss and transfer properties. The secondary or co-resin component of the ink vehicle may be selected from a wide variety of resin types such as rosin esters or modified rosin esters, terpene phenol resins, hydrocarbons and the like depending on specific formulation considerations. Co-resins preferably have ring and ball softening points ranging from about 100° to about 160° C., more preferably from about 105° to about 150 ° C. as determined by ASTM E28-67, and preferably have a MAGIESOL 47 tolerance greater than 200 mL/10 grams of a 50 wt. % solution in MAGIESOL 47. Resins which may be used as secondary or co-reins in ink vehicles according to the invention include, but are not limited to maleic modified rosin esters such as SYLVAPRINT 4538, phenolic modified rosin esters such as SYLVAPRINT 6006 and terpene phenol resins such as SYLVARES 7002 which are available from Arizona Chemical Company.

Hydrocarbon resins may also be used as secondary resins in ink vehicle formulations, however, some hydrocarbon resins may have limited compatibility with vegetable oils and alkyd resins, therefore their use in formulations which contain higher amounts of alkyds or vegetable oils should be selective. The alkyd compatibility issue with hydrocarbon resins also applies to the primary resin components of the ink vehicles. Specific examples of hydrocarbon resins which may be used as co-resins in ink vehicle formulations include, but are not limited to such hydrocarbon resins as described in U.S. Pat. Nos. 5,410,004 and 5,691,432 to Williams and U.S. Pat. No. 5,693,731 to Williams et al., incorporated herein by reference as if fully set forth. The amount of co-resin used in vehicle formulations depends upon the properties of the primary resin component and, if used, will generally range from about 5 wt. % to about 25 wt. % of the vehicle formulation.

In addition to the alkyd resin, the primary resin component and an optional co-resin or secondary resin component, the lithographic ink vehicle also contains relatively high boiling ink oils such as MAGIESOL 52 and INKOL N40 HT available 25 from Magie Brothers Oil Company, a Division of Pennzoil Corp. By "relatively high" it is meant that the boiling point of the ink oil should be at least about 180° C., and preferably at least about 240° C., however, ink oils of widely varying boiling points, depending on the particular printing application, may be used in combination with other components of the ink vehicle composition.

For use in lithographic ink vehicles, the boiling point range of the ink oil preferably ranges from about 180° to about 535° C., and most preferably ranges from about 240° to about 307° C. The amount of oil in the lithographic ink vehicle may range from about 20 to about 95% by weight, but preferably comprises from about 20 to about 65% by weight based on the total weight of the vehicle.

In order to provide an ink vehicle having suitable rheological properties, a gelling agent may also be included in the vehicle. Suitable gelling agents for use in the ink vehicle include organo-metallic gelling agents such as aluminum diisopropoxide acetoacetic ester chelate (AIE-M) or oxyaluminum octoate (OAO). When used, the amount of gelling agent in the vehicle may range from about 0.25 to about 5 wt. % of the total weight of the ink vehicle.

The order of addition of the components to a vessel to provide the ink vehicle is generally not critical to the invention. With the exception of the gelling agent, any or all of the components of the vehicle may be mixed in any order. Typically, the primary and any co-resins, the ink oil and the alkyd resin are charged to a mixing vessel and stirred while heating the mixture to a temperature in the range of from about 150° to about 170° C. Once the primary resin and co-resin components are substantially dissolved in the ink oil, the gelling agent is added, if necessary (depending on the application), with stirring to produce a gelled lithographic ink vehicle.

The following nonlimiting examples illustrate various additional aspects of the invention.

EXAMPLE 1

An alkyd resin in accordance with the invention was prepared by charging a 500 mL 4-neck flask with 139.7 grams of tall oil fatty acid (SYLFAT FA-2, available from Arizona Chemical Company), 67.2 grams of tetrahydrophthalic anhydride, 43.8 grams of 99 wt. % glycerine and 0.125 grams of 75 wt. % phosphoric acid while maintaining a nitrogen overhead atmosphere in the flask. The mixture was heated to 220° C. and maintained at this temperature with stirring for 21.25 hours while maintaining the overhead temperature at or less than 100° C. After 21.25 hours at 220° C., a sweep vacuum of 20 inches of Ha was applied for 15 minutes to expel any residual water. After breaking the vacuum with nitrogen, the product was cooled to 100° C. and filtered through a 150 micron filter bag. The product had an acid value of 2.6 as determined by ASTM D 803-93, a color of 5+ on the Gardner Delta scale, a Gardner Holdt viscosity of Z6.6 (286 seconds line to line by ASTM D-1545-89), an iodine value of 120.8 as determined by ASTM D 1959-85 and a hydroxyl value of 20.8 as determined by ASTM D 1957-63.

EXAMPLE 2

An alkyd resin in accordance with the invention was prepared by charging a 500 mL 4-neck flask with 139.7 grams of tall oil fatty acid (SYLFAT FA-2, available from Arizona Chemical Company), 67.2 grams of tetrahydrophthalic anhydride, 43.8 grams of 99 wt. % glycerine and 0.125 grams of 75 wt. % phosphoric acid while maintaining a nitrogen overhead atmosphere in the flask. The mixture was heated to 220° C. and maintained at this temperature with stirring for 4 hours while maintaining the overhead temperature at or less than 100° C. After 4 hours at 220° C., a very light nitrogen sparge was begun and continued for 10 hours to expel any residual water. The product was then cooled to 100° C. and filtered through a 150 micron filter bag. The product had an acid value of 4.2 as determined by ASTM D 803-93, a color of 5+ on the Gardner Delta scale, a Gardner Holdt viscosity of Z7.0 (379 seconds line to line by ASTM D-1545-89), an iodine value of 111 as determined by ASTM D 1959-85 and a hydroxyl value of 16.3 as determined by ASTM D 1957-63.

The resins made according to examples 1 and 2 were compared to a commercial alkyd resin and the properties of such are given in the following table.

TABLE 1

| Property | Commercial Alkyd Resin[1] | Alkyd Resin of Ex. 1 | Alkyd Resin of Ex. 2 |
| --- | --- | --- | --- |
| Acid Value | 13 | 2.6 | 4.2 |
| Gardner Holdt Viscosity | Z6.2 | Z6.6 | Z7.0 |
| Gardner Color | 10+ | 5+ | 5+ |
| Iodine Value | 111 | 120.8 | 111.0 |
| Hydroxyl Value | 44 | 20.8 | 16.3 |

[1]Commercial Alkyd Resin was a long oil alkyd resin based on mixed vegetable oils.

As can be seen by the foregoing table, there is no significant difference in the physical properties of a commercial alkyd resin as compared to the resins made according to the invention. However, the differences between the resins in their performance in ink vehicle formulations is manifest as illustrated by the following examples.

EXAMPLE 3

Ink vehicles were prepared using the commercial alkyd resin from Table 1 and the alkyd resins of Examples 1 and 2. Each ink vehicle contained 25.38 parts by weight of a phenolic modified rosin ester resin available from Arizona Chemical Company under the tradename SYLVAPRINT 6201HV, 15.38 parts by weight of a maleic modified rosin ester co-resin available from Arizona Chemical Company under the tradename SYLVAPRINT 4538, 15 parts by weight of the alkyd resin, 25 parts by weight of an ink solvent having an initial boiling point (IBP) of 268° C., and a KB value of 22.6 available from Magie Brothers Oil Company, a Division of Pennzoil Corp. under the tradename MAGIESOL 52, 17.24 parts by weight of an ink solvent having an IBP of 246° C. and a KB value of 37 available from Magie Brother Oil Company, a Division of Pennzoil Corp. under the tradename INKOL N40 HT and 2 parts by weight of oxyaluminum octoate (OAO) (50 wt. % OAO in solution in MAGIESOL 47). Relevant properties of the resulting ink vehicles were determined (with temperature correction to 25 ° C.) using a DUKE D-2050 viscometer from Duke Custom Systems, Inc. of Pleasant View, Tenn. and the properties are shown in the following table.

TABLE 2

| Properties Alkyd Resin Component | Vehicle 1 Commercial Alkyd Resin 1 from Table 1 | Vehicle 2 Alkyd Resin of Example 1 | Vehicle 3 Alkyd Resin of Example 2 |
| --- | --- | --- | --- |
| Viscosity[1] in poise at 2500 sec$^{-1}$ | 334 | 377 | 403 |
| Shear Stress[2] at 2.5 sec.$^{-1}$ | 3580 | 6051 | 7231 |
| Shortness ratio[3] | 10.7 | 16.0 | 17.9 |
| Slope[4] | 0.7673 | 0.7042 | 0.6934 |
| M47 tolerance[5] (mL/10 grams) | 16.5 | 12.5 | 12.5 |

[1]The viscosity of the ink vehicle and ink was determined using high shear conditions in order to predict press performance and is a measure of the internal friction of the liquid in motion. Shear rate is the velocity gradient through the stressed fluid under test. The unit of measure of the shear rate is "reciprocal second" (sec.$^{-1}$). The most commonly used shear rate for testing viscosity of vehicles and ink is 2500 sec.$^{-1}$.
[2]Shear stress was the shearing force per unit area. The unit of measure is dynes/cm$^2$. Shear stress was measured at 2.5 sec.$^{-1}$.
[3]Shortness Ratio was calculated as the shear stress divided by the viscosity. Shortness ratio is not always a reliable measure of gel structure but is sometimes used as an indicator of such and is defined in ASTM D 4040-89 as the property of a solution which prevents it from being drawn into a filament.
[4]Slope is a parameter measuring how far the vehicle (resin solution) deviates from a Newtonian solution (a solution exhibiting constant viscosity throughout a range of shear rates of interest at a constant temperature). The value for a Newtonian solution is 1.0. Shear thinning liquids such as most ink vehicles exhibit viscosities which change according to the shear rate. The slope is the best measure of gel structure, the farther from 1.0, the lower the slope, the greater the gel structure. (Some computer programs for Laray viscometer data computations show the reciprocal of the slope which indicates higher numbers as the gel structure increases as shown in U.S. Pat. No. 5,427,615 to Jordan and U.S. Pat. No. 5,410,004 to Williams).
[5]M47 tolerance was determined by titrating 10 grams of the solution with MAGIESOL 47 to a cloud point (M47 tolerance).

Vehicles 2 and 3 shown in Table 2 made with alkyd resins of the invention exhibited higher viscosities and better gel structures than Vehicle 1 made with a commercial mixed vegetable oil derived alkyd resin. Because of the higher viscosities and improved gel structure, the alkyd resins of the invention provide an economic advantage over commercially available alkyd resins in the production of ink vehicles since relatively more low cost ink oil can be used and relatively less high cost gelling agent is needed to provide an ink vehicle having the desired gel structure and viscosity.

EXAMPLE 4

Ink compositions were prepared from each of the ink vehicles shown in Table 2 and the properties of the ink compositions were compared. Each ink composition contained 57.14 parts of the ink vehicle, 0.95 parts metallic drying agent and 38.1 parts of lithol rubine quickset flush, and 3.81 parts polyethylene wax compound. The metallic drying agent was a cobalt-manganese drying agent available from Mooney Chemicals, Inc. of Cleveland, Ohio under the tradename cobalt-manganese LINALL P. I. drier. In each of the ink compositions, sufficient ink solvent was added to the compositions to adjust the tack to about 11.4.

Relevant properties of the ink compositions made with the ink vehicles of Table 2 are given in the following table.

TABLE 3

| Properties | Ink #1 From Vehicle #1 | Ink #2 From Vehicle #2 | Ink #3 From Vehicle #3 |
| --- | --- | --- | --- |
| Tack at 1200 r.p.m. | 11.4 | 11.4 | 11.4 |
| Tack-free[1] (coated book) (in min.) | 17 | 7 | 8 |
| Tack-free[2] (MYLAR film) (in min.) | 114 | 99 | 81 |
| Misting[3] | 5 | 4 | 3 |
| Appearance[4] over plain coated paper | slight bronze on ink surface | no bronze, cleaner shade | no bronze, cleaner shade |
| Appearance over the printed black bar | moderate bronze on ink surface | no bronze, bluer shade | no bronze, bluer shade |

[1]Tack-free time was measured by finger touch on coated book stock prints which were offset printed on a Little Joe lab proofer using 1.2 grams of ink. The fourth successive print was used for the drying test.
[2]Tack-free time was measured by finger touch on MYLAR film #142 from DuPont Company of Wilmington, Delaware which was offset printed on a Little Joe lab proofer using 1.2 grams of ink. The third successive print was used for the drying test.
[3]Misting was determined on an inkometer at 1200 rpm, 32.2° C. Scale: 0 = no misting, 10 = heavy misting.
[4]Appearance is the visual appearance of side by side (control/experimental) proofs which were direct printed from a 0.4 mil constant depth gauge on black bar coated book stock using the Little Joe Lab proofer. The proofs were visually compared at varying light angles.

As seen from the foregoing comparisons, ink compositions made with the alkyd resins of the invention exhibit substantially faster drying times and improved misting properties than the comparable commercial alkyd resin.

The absence of the "bronze" appearance on the surface of the inks containing the alkyd resins of the invention is a significant advantage of the invention. Surface bronze appearance on printed surfaces appears to slightly change color as the angle of viewing and illumination changes and is a function of pigment particles not being well coated by the ink vehicle (poor pigment wetting). Bronze appearance on the printed surface increases as the concentration of pigment increases in the ink and usually appears more notable where two or more colors are trapped, such as type printed over solid areas as in the above described proofs which were printed over the black bar.

Another area for improved pigment wetting properties where alkyd resins have traditionally been used is in pigment flushes where the resins are often used to aid water breakout as described in U.S. Pat. No. 5,820,667 to Lu et al., incorporated herein by reference as if fully set forth. The pigment wetting property of an alkyd resin is one of the critical properties of concern when choosing a water breakout aid for pigment flushing. Because of their improved wetting properties, the alkyd resins of the invention are well suited for use as flushing aids for pigment flushing.

The following example illustrates the advantage of the alkyd resins according to the invention when used as a pigment flushing aid.

EXAMPLE 5

In order to demonstrate the superior performance of the alkyd resins of the invention over conventional mixed vegetable oil derived alkyd resins which are used as water breakout aids in pigment flushes, a flushing agent was made consisting of 20 grams of a hydrogenated aliphatic ink oil available from Exxon Company U.S.A. of Houston, Tex. under the tradename EXXPRINT 283-D, and 30 grams of SYLVAPRINT 4538. Pigment flush compositions were made using each of the three alkyd resins of Table 1 by weighing 30.05 grams of the flushing agent into the mixing bowl of a DUKE model D-10 emulsification tester which is available from Duke Custom Systems, Inc. and adding 5 grams of the alkyd resin and 64.95 grams of phthalocyanine blue presscake. The mixture was stirred in the emulsification tester at 90 rpm for 5 minutes. After running for 5 minutes, the sides of the mixing container were scraped with an ink spatula and the emulsification tester was run an additional 5 minutes at 90 rpm after which the displaced water was decanted from the mixing container and weighed. The flush compositions and results of the flushing tests are given in the following table.

TABLE 4

| Flushing agent (grams) | 30.05 | 30.05 | 30.05 |
|---|---|---|---|
| Alkyd resin (grams) | Commercial Alkyd Resin from Table 1<br>5 | Ex. #1 Alkyd resin from Table 1<br>5 | Ex. #2 Alkyd resin from Table 1<br>5 |
| Presscake (grams) | 64.95 | 64.95 | 64.95 |
| Water decanted from flushes after 10 minutes mixing | | | |
| grams | 29.16 | 31.2 | 31.47 |

As seen by the foregoing example, flush compositions containing the alkyd resins of the invention displaced substantially more water from the pigment presscake than the flush composition containing the commercial mixed vegetable oil alkyd resin. The resins of the invention therefore provide more efficient flushing aids for pigment flushing.

The foregoing description of certain embodiments of the present invention has been provided for purposes of illustration only, and it is understood that numerous modifications and alterations may be made without departing from the spirit and scope of the invention as defined in the following claims.

What is claimed is:

1. An ink vehicle which comprises a primary resin selected from the group consisting of rosin esters, phenolic modified rosin esters, maleic modified rosin esters, hydrocarbon resins, and modified hydrocarbon resins, an ink solvent having a boiling point of from about 180° C. to about 535° C., and from about 1 to about 30% by weight of an alkyd resin having a Gardner-Holdt viscosity of from about Z6.0 to about Z7.5 and an acid number less than about 5, the alkyd resin consisting essentially of the reaction product of 1,2,3,6-tetrahydrophthalic anhydride, a polyol selected from the group consisting of glycerol, trimethylolethane, trimethylolpropane, and dimethylolpropane, and a tall oil acid.

2. The vehicle of claim 1 containing from about 20 to about 65% by weight primary resin and from about 20 to about 65% by weight ink solvent.

3. The vehicle of claim 2 further comprising from about 0.25 to about 5% by weight metallic gelling agent.

4. An ink composition comprising an ink vehicle according to claim 3.

5. The vehicle of claim 1 wherein the primary resin comprises a phenolic modified rosin ester.

6. The vehicle of claim 1 wherein the primary resin comprises a maleic modified rosin ester.

7. The vehicle of claim 1 wherein the primary resin comprises a modified hydrocarbon resin.

8. An ink composition comprising an ink vehicle according to claim 1.

9. The vehicle of claim 1 further comprising a co-resin selected from the group consisting of hydrocarbon-based resins, terpene based resins, rosin esters and modified rosin esters.

10. A method for making an ink vehicle consisting essentially of reacting 1,2,3,6-tetrahydrophthalic anhydride, a polyol selected from the group consisting of glycerol trimethylolethane, trimethylolpropane, and dimethylolpropane, and a tall oil fatty acid under conditions sufficient to produce an alkyd resin having a Gardner-Holdt viscosity of from about Z6.0 to about Z7.5 and an acid number less than about 5, and mixing from about 1 to about 30 wt. % of the alkyd resin with a primary resin selected from the group consisting of rosin esters, phenolic modified rosin esters, maleic modified rosin esters, hydrocarbon resins, and modified hydrocarbon resins, an ink solvent having a boiling point of from about 180° C. to about 535° C. and, optionally, a metallic gelling agent.

11. The method of claim 10 wherein the primary resin comprises a mealeic modified rosin ester of pentaerythritol.

12. The method of claim 10 wherein the alkyd resin is combined with from about 20 to about 65% by weight primary resin and from about 20 to about 65% by weight ink solvent.

13. The method of claim 10 wherein from about 0.25 to about 5% by weight metallic gelling agent is combined with the alkyd resin, primary resin and ink solvent.

14. The method of claim 10 wherein the primary resin comprises a phenolic modified rosin ester.

15. An ink composition containing an ink vehicle made according to the method of claim 14.

16. The method of claim 10 wherein the primary resin comprises a maleic modified rosin ester.

17. The method of claim 10 wherein the primary resin comprises a modified hydrocarbon resin.

18. An ink composition containing an ink vehicle made according to the method of claim 10.

19. An ink composition comprising pigment and from about 45 to about 65% by weight of an ink vehicle, the ink vehicle comprising a primary resin selected from the group consisting of gum rosin, tall oil rosin, and wood rosin esters and esters dimerized rosins, an ink solvent having a boiling point of from about 180° C. to about 535° C., and from about 1 to about 30% by weight of an alkyd resin consisting essentially of the reaction product of 1,2,3,6-tetrahydrophthalic anhydride, a polyol selected from the group consisting of glycerol, triethylolethane, trimethylolpropane, and dimethylolpropane, and a tall oil fatty acid, said alkyd resin having a Gardner-Holdt viscosity of from about Z6.0 to about Z7.5, and an acid number less than about 5.

20. The ink composition of claim 19 wherein the pigment comprises a flushed pigment.

21. The ink composition of claim 19 wherein the ink vehicle comprises from about 20 to about 65% by weight primary resin and from about 20 to about 65% by weight ink solvent.

22. The ink composition of claim 19 wherein the ink vehicle further comprises from about 0.25 to about 5% by weight metallic gelling agent.

23. The ink composition of claim 19 further comprising a metallic drying agent.

24. A flushed pigment comprising pigment and from about 5 to about 15 wt. % alkyd resin consisting essentially of the reaction product of 1,2,3,6-tetrahydrophthalic anhydride, a polyol selected from glycerol, trimethylolethane, trimethylolpropane, and dimethylolpropane, and a tall oil fatty acid, said alkyd resin having a Gardner-Holdt viscosity of from about Z6.0 to about Z7.5, and an acid number less than about 5.

* * * * *

UNITED STATES PATENT AND TRADEMARK OFFICE
CERTIFICATE OF CORRECTION

PATENT NO. : 6,632,859 B1
DATED : October 14, 2003
INVENTOR(S) : Raymond H. Jones et al.

It is certified that error appears in the above-identified patent and that said Letters Patent is hereby corrected as shown below:

<u>Column 2,</u>
Line 15, after "on" delete "modem" and insert therefor -- modern --.

<u>Column 5,</u>
Line 8, after "to" delete "20".
Line 49, after "to," delete "SYLVAPFNT" and insert therefor -- SYLVAPRINT --.

Signed and Sealed this

Third Day of February, 2004

JON W. DUDAS
*Acting Director of the United States Patent and Trademark Office*